(12) United States Patent
Lee et al.

(10) Patent No.: US 9,837,833 B2
(45) Date of Patent: Dec. 5, 2017

(54) DISCHARGE BALANCING DEVICE, DISCHARGE BALANCING METHOD, AND POWER SUPPLY SYSTEM

(71) Applicant: Silergy Corp.

(72) Inventors: Ming-Hsien Lee, Hsinchu (TW); Chih-Chin Hsieh, Hsinchu (TW)

(73) Assignee: Silergy Corp., Cayman Islands (GB)

( * ) Notice: Subject to any disclaimer, the term of this patent is extended or adjusted under 35 U.S.C. 154(b) by 407 days.

(21) Appl. No.: 14/474,175

(22) Filed: Aug. 31, 2014

(65) Prior Publication Data
US 2016/0064968 A1    Mar. 3, 2016

(51) Int. Cl.
*H02J 7/00*    (2006.01)
(52) U.S. Cl.
CPC .......... *H02J 7/0021* (2013.01); *H02J 7/0016* (2013.01)
(58) Field of Classification Search
CPC .................................................. H02J 7/0021
USPC ................................................ 320/116–124
See application file for complete search history.

(56) References Cited

U.S. PATENT DOCUMENTS

2012/0086399 A1*    4/2012    Choi ..................... H02J 7/0026
                                                                320/116

* cited by examiner

*Primary Examiner* — Richard V Muralidar

(57) ABSTRACT

A discharge balancing device, for balancing a plurality of electric energy storage units connected in series in a discharge stage, comprising a plurality of bypass units, respectively connected to the plurality of electric energy storage units in parallel, configured to drain bypass currents from the plurality of electric energy storage units according to control signals; an energy condition measurement circuit, coupled to the plurality of the electric energy storage units, configured to measure energy conditions of the plurality of electric energy storage units; and a balancing control unit, coupled to the energy condition measurement circuit and the plurality of bypass units, configured to generate each of the control signals according to the energy conditions measured by the energy condition measurement circuit, so as to control each of the plurality of bypass units whether to drain a bypass current from a corresponding electric energy storage unit.

32 Claims, 6 Drawing Sheets

DISCHARGE BALANCING DEVICE, DISCHARGE BALANCING METHOD, AND POWER SUPPLY SYSTEM

BACKGROUND OF THE INVENTION

1. Field of the Invention

The present invention relates to a discharge balancing device, a discharge balancing method and a power supply system, and more particularly, to a discharge balancing device, a discharge balancing method, and a power supply system capable of performing discharge balancing according to capacities of electric energy storage units.

2. Description of the Prior Art

A portable electronic device, such as a smart phone, a notebook, a tablet computer, etc., is needed to be powered by a rechargeable battery. The rechargeable battery is composed of a plurality of electric energy storage units. It is unavoidable that different electric energy storage units have different statuses, which may result in reliability issues. For example, given the fact that some of the electric energy storage units have higher internal resistances due to defects (such as manufacturing variation) and/or utility conditions (such as charging/discharging times), when the electric energy storage units are connected in series, the electric energy storage units having higher internal resistances are forced to consume more power than the others, causing the electric energy storage units having higher internal resistances to be deteriorated faster than the others. Once an electric energy storage unit having a higher internal resistance depletes, the entire battery fails to provide electric power, even some well-condition electric energy storage units are contained in the battery, causing a waste of resources.

Therefore, there is a need to improve over the prior art.

SUMMARY OF THE INVENTION

It is therefore a primary objective of the present invention to provide a discharge balancing device, a discharge balancing method, and a power supply system which perform discharge balancing according to capacities of a plurality of electric energy storage units.

The invention discloses a discharge balancing device, for balancing a plurality of electric energy storage units connected in series in a discharge stage, comprising a plurality of bypass units, respectively connected to the plurality of electric energy storage units in parallel, configured to drain bypass currents from the plurality of electric energy storage units according to control signals; an energy condition measurement circuit, coupled to the plurality of the electric energy storage units, configured to measure energy conditions of the plurality of electric energy storage units; and a balancing control unit, coupled to the energy condition measurement circuit and the plurality of bypass units, configured to generate each of the control signals according to the energy conditions measured by the energy condition measurement circuit, so as to control each of the plurality of bypass units whether to drain a bypass current from a corresponding electric energy storage unit.

The invention further discloses a discharge balancing method, for balancing a plurality of electric energy storage units connected in series in a discharge stage, the discharge balancing method comprising measuring energy conditions of the plurality of electric energy storage units; and controlling each of the plurality of bypass units whether to drain a bypass current from a corresponding electric energy storage unit according to the measured energy conditions.

The invention further discloses an power supply system, comprising a plurality of electric energy storage units, connected in series; and a discharge balancing device, coupled to the plurality of electric energy storage units, for balancing the plurality of electric energy storage units in a discharge stage, the discharge balancing device comprising a plurality of bypass units, respectively connected to the plurality of electric energy storage units in parallel, configured to drain bypass currents from the plurality of electric energy storage units according to control signals; an energy condition measurement circuit, coupled to the plurality of the electric energy storage units, configured to measure energy conditions of the plurality of electric energy storage units; and a balancing control unit, coupled to the energy condition measurement circuit and the plurality of bypass units, configured to generate each of the control signals according to the energy conditions measured by the energy condition measurement circuit, so as to control each of the plurality of bypass units whether to drain a bypass current from a corresponding electric energy storage unit.

The invention further discloses a discharge balancing device, for balancing a plurality of electric energy storage units connected in series in a discharge stage, comprising a plurality of switch units, connected in series and parallel to the plurality of electric energy storage units, each configured to be conducted according to control signals; a plurality of impedance units, each having one terminal electrically connected to adjacent electric energy storage units of plurality of electric energy storage units and another terminal electrically connected to adjacent switch units of the plurality of switch units; an energy condition measurement circuit, coupled to the plurality of the electric energy storage units, configured to measure energy conditions of the plurality of electric energy storage units; and a balancing control unit, coupled to the energy condition measurement circuit and the plurality of switch units, configured to generate each of the control signals according to the energy conditions measured by the energy condition measurement circuit, so as to control each of the plurality of switch units whether to drain a bypass current from a corresponding electric energy storage unit.

The invention further discloses an power supply system, comprising a plurality of electric energy storage units, connected in series; and a discharge balancing device, coupled to the plurality of electric energy storage units, for balancing the plurality of electric energy storage units in a discharge stage, the discharge balancing device comprising a plurality of switch units, connected in series and parallel to the plurality of electric energy storage units, each configured to be conducted according to control signals; a plurality of impedance units, each having one terminal electrically connected to adjacent electric energy storage units of plurality of electric energy storage units and another terminal electrically connected to adjacent switch units of the plurality of switch units; an energy condition measurement circuit, coupled to the plurality of the electric energy storage units, configured to measure energy conditions of the plurality of electric energy storage units; and a balancing control unit, coupled to the energy condition measurement circuit and the plurality of switch units, configured to generate each of the control signals according to the energy conditions measured by the energy condition measurement circuit, so as to control each of the plurality of switch units whether to drain a bypass current from a corresponding electric energy storage unit.

These and other objectives of the present invention will no doubt become obvious to those of ordinary skill in the art after reading the following detailed description of the preferred embodiment that is illustrated in the various figures and drawings.

DETAILED DESCRIPTION

To prevent a rechargeable battery having a plurality of electric energy storage units from malfunctioning due to depletion of an electric energy storage unit, balancing the electric energy storage units is required. A method for balancing the electric energy storage units is balancing discharging operations of the electric energy storage units according to voltage values of the electric energy storage units. However, voltage and capacity of an electric energy storage unit may have a nonlinear relationship, which means that two electric energy storage units within the rechargeable battery may have a negligible voltage difference in between even a capacity difference in between is observable. As the rechargeable battery keeps discharging until the voltage difference becomes observable, it might not have sufficient time to balance the two electric energy storage units since the capacity difference in between is too large, causing the electric energy storage unit balancing performed improperly. To prevent this scenario, the present invention performs balancing according to capacities of the electric energy storage units.

Figure 1:
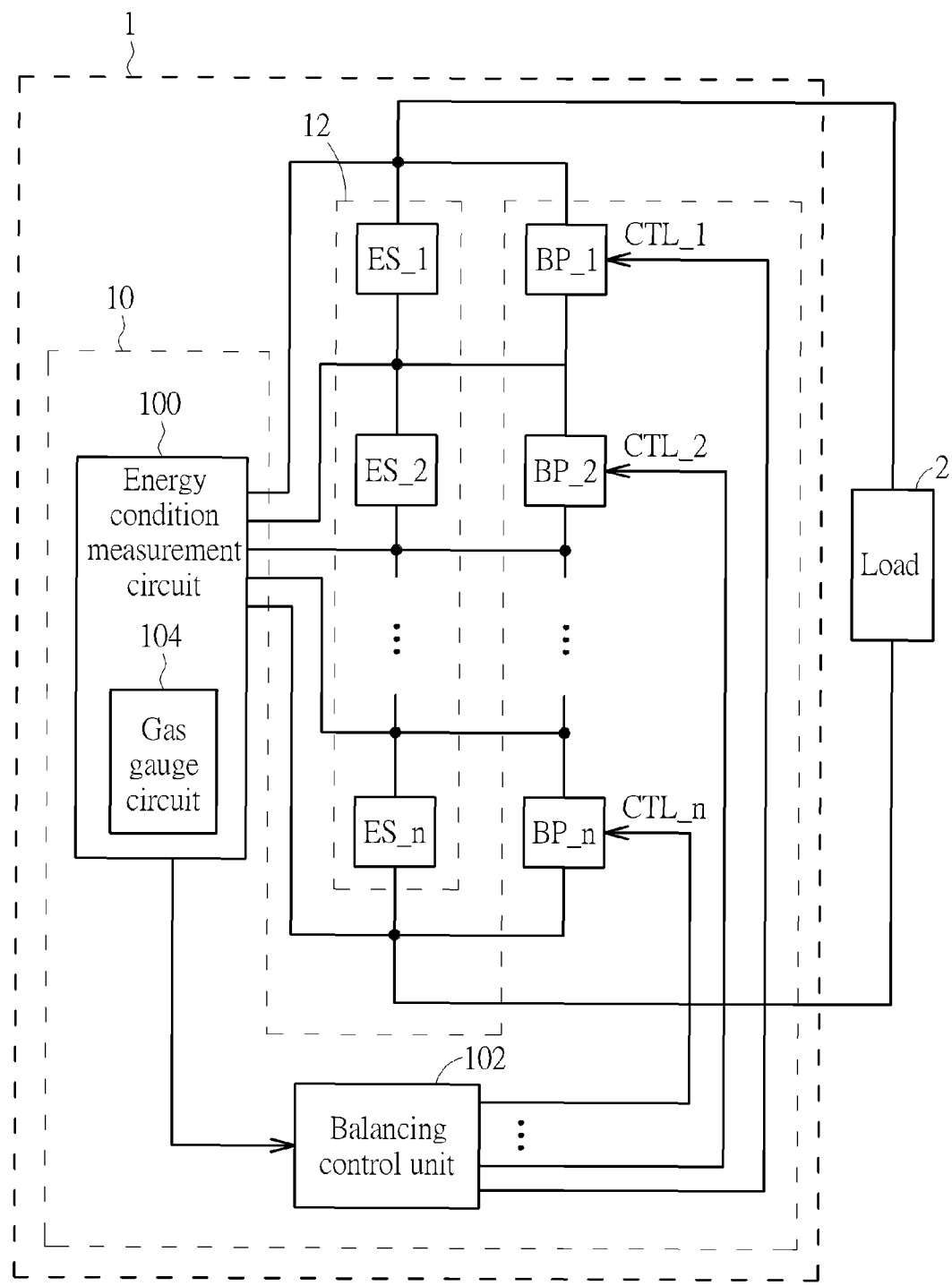
FIG. 1 is a schematic diagram of a power supply system according to an embodiment of the invention.

Please refer to FIG. 1, which is a schematic diagram of a power supply system 1 according to an embodiment of the present invention. The power supply system 1 comprises a battery pack 12 and a discharge balancing device 10, and provides electric power to a load 2. The battery pack 12 comprises a plurality of electric energy storage units $ES\_1$-$ES\_n$, which are connected in series. Each of the energy storage units may comprise at least a battery cell, and the at least a battery cell within an energy storage unit may be connected in series or in parallel, not limited herein. The discharge balancing device 10 comprises a plurality of bypass units $BP\_1$-$BP\_n$, an energy condition measurement circuit 100 and a balancing control unit 102. The bypass units $BP\_1$-$BP\_n$ are connected to the electric energy storage units $ES\_1$-$ES\_n$ in parallel, respectively. Each of the bypass units $BP\_1$-$BP\_n$ is configured to drain a bypass current from the corresponding electric energy storage units $ES\_1$-$ES\_n$ according to control signals $CTL\_1$-$CTL\_n$. Take the bypass unit $BP\_1$ as an example, the bypass unit $BP\_1$ is connected to the energy storage unit $ES\_1$ in parallel, and is configured to drain a bypass current from the energy storage unit $ES\_1$ according to the control signal $CTL\_1$. The energy condition measurement circuit 100 is coupled to the electric energy storage units $ES\_1$-$ES\_n$, for measuring energy conditions of the electric energy storage units $ES\_1$-$ES\_n$. An energy condition of an electric energy storage unit may be a measured voltage value, a measured capacity, etc., of the electric energy storage unit. The balancing control unit 102 are coupled to the energy condition measurement circuit 100 and the bypass units $BP\_1$-$BP\_n$, and configured to generate the control signals $CTL\_1$-$CTL\_n$ according to the energy conditions measured by the energy condition measurement circuit 100, so as to control each of the bypass units $BP\_1$-$BP\_n$ whether to drain a bypass current from the corresponding electric energy storage unit.

Specifically, the energy condition measurement circuit 100 comprises a gas gauge circuit 104, for measuring a capacity of each of the electric energy storage units $ES\_1$-$ES\_n$, and sends information of the capacities of the electric energy storage units $ES\_1$-$ES\_n$ to the balancing control unit 100. In an embodiment, the balancing control unit 100 generates the control signals $CTL\_1$-$CTL\_n$ according to the capacities of the electric energy storage units $ES\_1$-$ES\_n$, to instruct each of the bypass units $BP\_1$-$BP\_n$ whether or not to drain a bypass current from the corresponding electric energy storage unit for a period of time. For example, suppose the electric energy storage unit $ES\_x$ is the one among the electric energy storage units $ES\_1$-$ES\_n$ having the largest capacity. The balancing control unit 102 generates the control signal $CTL\_x$ to configure the bypass units $BP\_x$ to drain a bypass current from the electric energy storage unit $ES\_x$. Thus, the discharging rate of the electric energy storage unit $ES\_x$ is higher than the discharging rates of the rest of the electric energy storage units $ES\_1$-$ES\_n$.

Notably, in this embodiment, the energy conditions for the balancing control unit 102 are the measured capacities of the electric energy storage units, and the balancing discharging operations of the electric energy storage units are based on the capacities of the electric energy storage units. Since the capacity differences of the electric energy storage units are more observable, the balancing discharging operations may be started earlier. Thus, it would have sufficient time to discharge the electric energy storage unit having the largest capacity by raising its discharging rate, allowing the electric energy storage unit balancing performed properly, such that the life of the battery pack 12 is lengthened.

Figure 2:
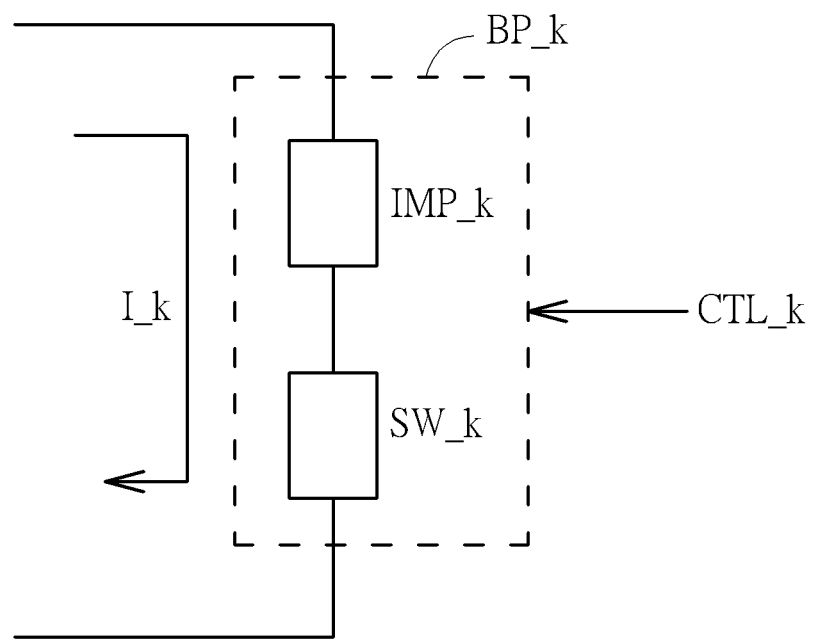
FIG. 2 is a schematic diagram of a bypass unit according to an embodiment of the invention.

Furthermore, please refer to FIG. 2, which is a schematic diagram of a bypass unit $BP\_k$ of the bypass units $BP\_1$-$BP\_n$ according to an embodiment of the present invention. As shown in FIG. 2, each of the bypass units $BP\_1$-$BP\_n$, say, the bypass unit $BP\_k$, comprises an impedance unit $IMP\_k$ and a switch unit $SW\_k$, wherein the impedance unit $IMP\_k$ and the switch unit $SW\_k$ are connected in series. The switch unit $SW\_k$ can be a voltage controlled switch, such as a bipolar junction transistor (BJT), a field effect transistor (FET), etc. The switch unit $SW\_k$, receiving the control signal $CTL\_k$, is configured to conduct a bypass current $I\_k$ accordingly. A magnitude of the bypass current $I\_k$ is determined by the impedance unit $IMP\_k$. The impedance unit $IMP\_k$ may be a fixed resistor, a variable resistor, a voltage controlled resistor, etc. In other words, if the balancing control unit 102 decides that the bypass current $I\_k$ should be drained from the corresponding electric energy storage unit $ES\_k$, the balancing control unit 102 generates a control signal $CTL\_k$ to turn on the switch unit $SW\_k$, conducting the bypass current $I\_k$. Otherwise, the switch unit $SW\_k$ remains off, meaning that the bypass unit is cut off and conducts no current.

Figure 3:
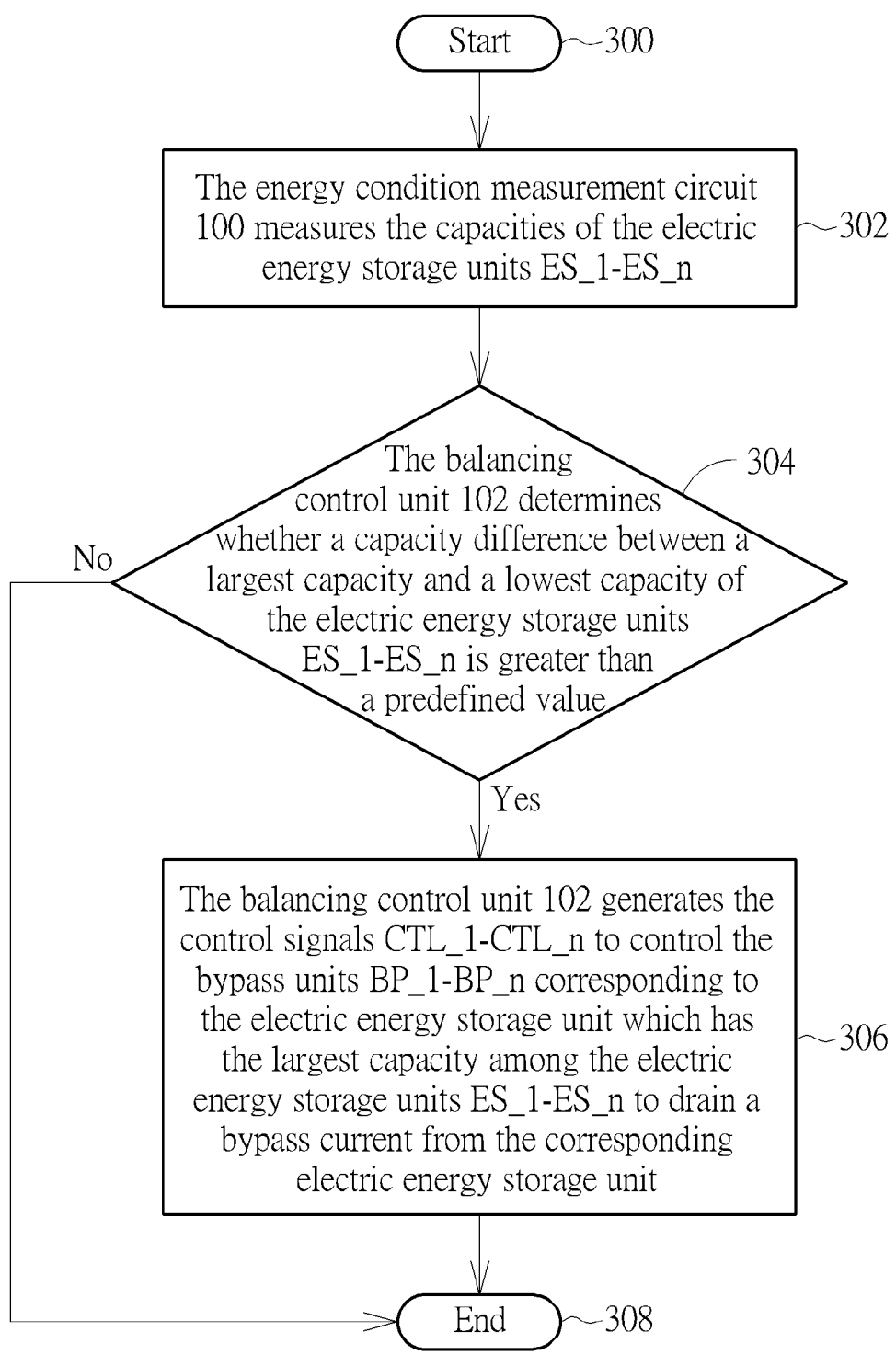
FIG. 3 is a schematic diagram of a discharge balancing process according to an embodiment of the invention.

The method of the discharge balancing device 10 balancing the electric energy storage units ES_1-ES_n can be further summarized into a discharge balancing process 30. The discharge balancing process 30 is executed by the discharge balancing device 10. As shown in FIG. 3, the discharge balancing process 30 comprises following steps:

Step 300: Start.

Step 302: The energy condition measurement circuit 100 measures the capacities of the electric energy storage units ES_1-ES_n.

Step 304: The balancing control unit 102 determines whether a capacity difference between a largest capacity and a lowest capacity of the electric energy storage units ES_1-ES_n is greater than a predefined value. If the capacity difference is greater than the predefined value, proceed to Step 306; otherwise, proceed to Step 308.

Step 306: The balancing control unit 102 generates the control signals CTL_1-CTL_n to control the bypass units BP_1-BP_n corresponding to the electric energy storage unit which has the largest capacity among the electric energy storage units ES_1-ES_n to drain a bypass current from the corresponding electric energy storage unit.

Step 308: End.

According to the balancing process 30, the discharge balancing device 10 may generate the control signals CTL_1-CTL_n, and instruct each of the bypass units BP_1-BP_n whether or not to drain the bypass current from the corresponding electric energy storage unit, so as to adjust the discharging rates of the electric energy storage units ES_1-ES_n according to the capacities, alleviating a deterioration toward depletion of aged or ill-condition electric energy storage unit.

Specifically, a determination criterion is set in Step 304 to determine whether or not to proceed with the discharge balancing process 30. The discharge balancing process 30 proceeds if the capacity difference between the largest capacity and the lowest capacity of the electric energy storage units ES_1-ES_n is greater than the predefined value. Otherwise, if the capacity difference between the largest and the lowest capacities is smaller than the predefined value, meaning that the electric energy storage units ES_1-ES_n are in a balanced status, then there is no need to proceed with the discharge balancing process 30.

In Step 306, the balancing control unit 102 determines the electric energy storage unit, e.g. ES_x, which has the largest capacity among the electric energy storage units ES_1-ES_n. The balancing control unit 102 then generates the control signal CTL_x to turn on the switch unit SW_x, to drain the bypass current I_x from the electric energy storage unit ES_x. Meanwhile, the rest of the bypass units BP_1-BP_n remain cut off.

Notably, in the embodiment, the balancing control unit 102 determines whether to proceed with discharge balancing process 30 according to the capacity difference between the largest capacity and the lowest capacity of the electric energy storage units ES_1-ES_n. Those skilled in the art may make modifications accordingly. For example, in another embodiment, the balancing control unit 102 may determine whether to proceed with the discharge balancing process 30 according to the capacity difference between the largest capacity and an average of the capacities of the electric energy storage units ES_1-ES_n, which is not limited herein.

In addition, in the embodiment, balancing among electric energy storage units ES_1-ES_n is to drain a bypass current for a discharge balancing period. The discharge balancing period is predefined. The discharge balancing process 30 is executed periodically with the constant predefined period. Those skilled in the art may make modifications accordingly. For example, the discharge balancing process 30 may be performed repeatedly with variable balancing periods, and the variable balancing periods may depend on a capacity difference between the largest and the lowest capacities of the electric energy storage units ES_1-ES_n, which can be modified accordingly and not limited herein.

Figure 4:
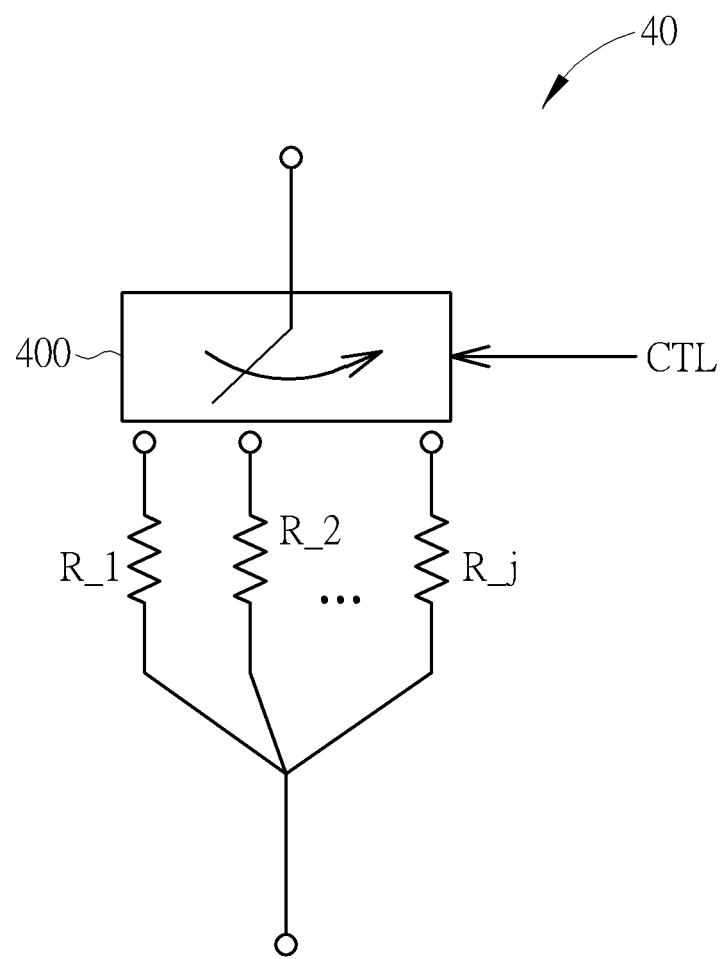
FIG. 4 is a schematic diagram of an impedance unit according to an embodiment of the invention.
Figure 5:
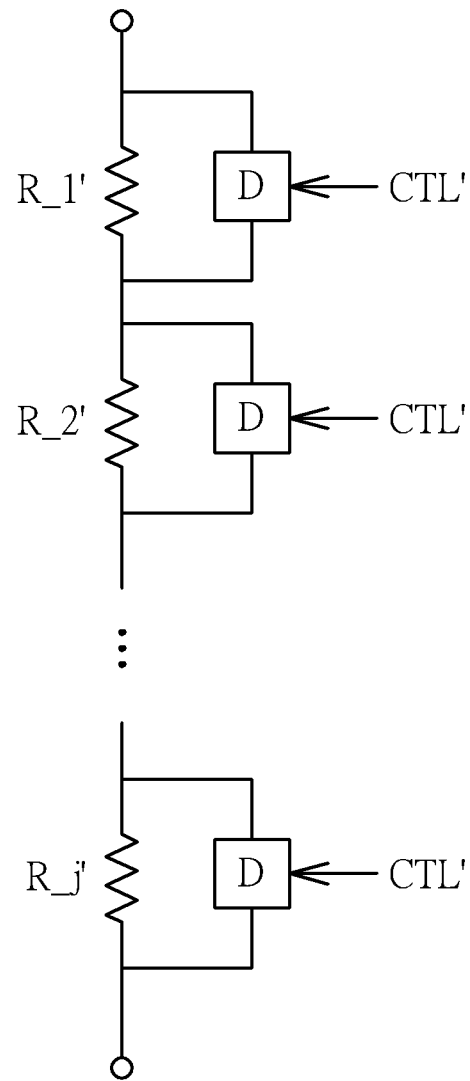
FIG. 5 is a schematic diagram of an impedance unit according to an embodiment of the invention.

Furthermore, since the magnitude of the bypass current drained by the bypass unit is determined by the impedance value of the impedance unit of the bypass unit, and the magnitude of the bypass current relates to the discharging rate of the corresponding electric energy storage unit, a structure of each of the impedance unit can be modified accordingly to control the impedance value of the impedance unit. For example, please refer to FIG. 4, which is a schematic diagram of an impedance unit 40 according to an embodiment of the present invention. As shown in FIG. 4, the impedance unit 40 comprises a selection unit 400 and a plurality of resistors R_1-R_j, wherein the resistors R_1-R_j have various resistance values. The selection unit 400 receives a control signal CTL generated by the balancing control unit 102, to select a resistor from the resistors R_1-R_j according to the control signal CTL. Hence, an impedance value of the impedance unit 40 is changeable according to the control signal CTL, for adaptively adjusting a discharging rate of the corresponding bypass unit. The impedance unit 40 can be applied to the impedance units IMP_1-IMP_n of the bypass units BP_1-NP_n in FIG. 1B. Alternatively, please refer to FIG. 5, which is a schematic diagram of an impedance unit 50 according to an embodiment of the present invention. As shown in FIG. 5, the impedance unit 50 comprises a plurality of resistors R_1'-R_j' connected in series. Each of the resistors R_1'-R_j' is connected to a decision unit D in parallel. The decision unit D receives a control signal CTL', to be turned on, shorting two terminals of the resistor, or be cut off according to the control signal CTL'. Hence, an impedance value of the impedance unit 50 is changeable according to the control signal CTL', for adaptively adjusting a discharging rate of the corresponding bypass unit. The impedance unit 50 can be applied to the impedance units IMP_1-IMP_n of the bypass units BP_1-NP_n in FIG. 1B.

Figure 6:
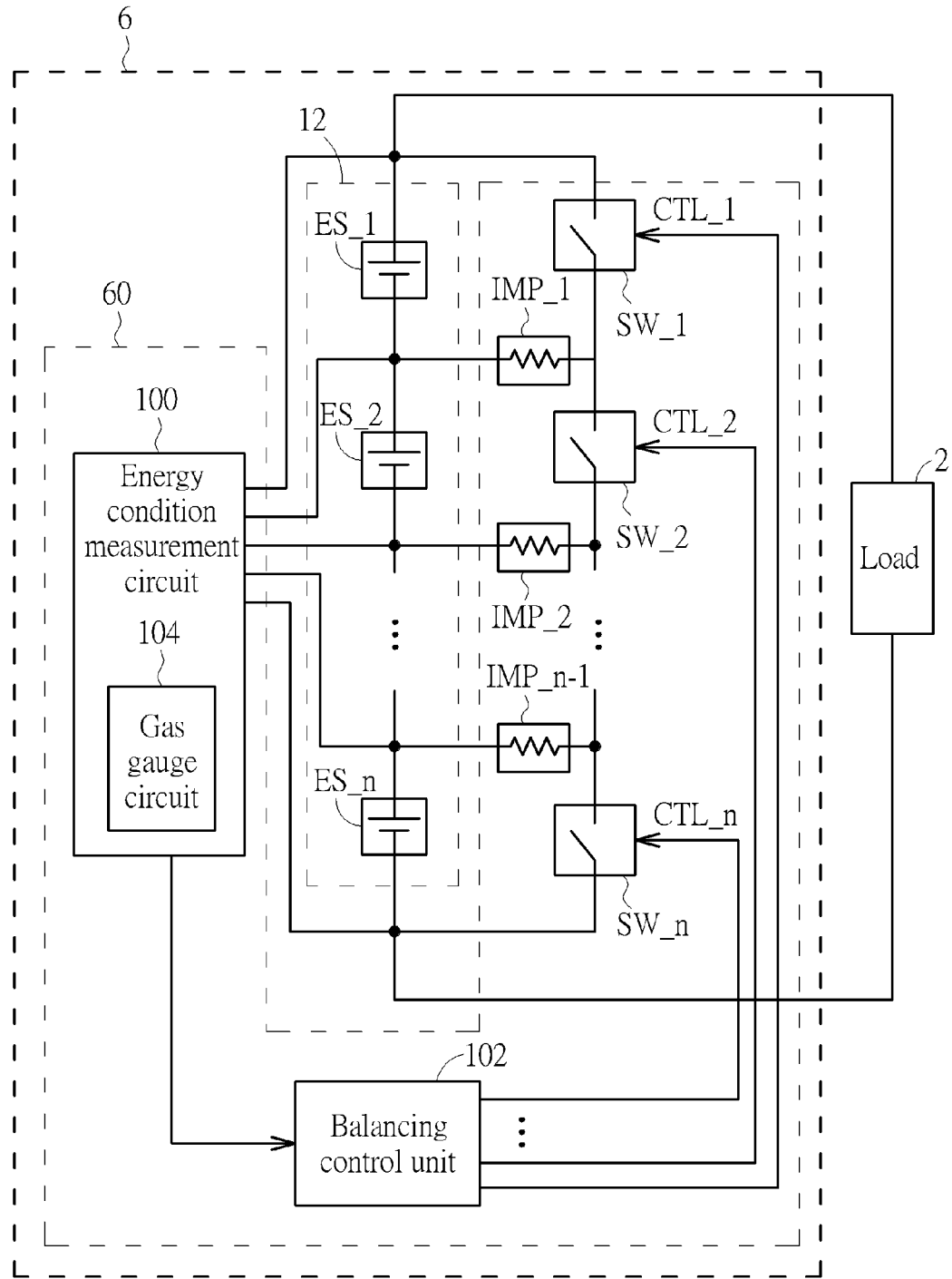
FIG. 6 is a schematic diagram of a power supply system according to another embodiment of the invention.

Notably, the power supply system 1 in FIG. 1 is an embodiment of the present invention. Those skilled in the art may make modifications and alternations accordingly. For example, the connecting method between the impedance units and the switch units as shown in FIG. 2 may be modified. Please refer to FIG. 6, which is a schematic diagram of a power supply system 6 according to an embodiment of the present invention. The structure of the power supply system 6 is similar to that of the power supply system 1 with bypass unit implementation shown in FIG. 2, and thus, the same units are denoted by the same symbols. The difference between the power supply system 6 and the power supply system 1 is the connecting method between the impedance units and the switch units. As shown in FIG. 6, the switch units SW_1-SW_n are connected in series and parallel to the electric energy storage units ES_1-ES_n. One terminal of each of the impedance units IMP_1-IMP_n is connected between adjacent electric energy storage units, and another terminal thereof is connected between adjacent switch units. Each of the switch units SW_1-SW_n is configured to be conducted according to the control signals CTL_1-CTL_n generated by the balancing control unit 102. Operating principles of the power supply system 6 are similar to those of the power supply system 1, and can be referred to the relative paragraphs stated above, which are not narrated herein for brevity.

In summary, in comparison to the prior art performing balancing among the electric energy storage units according to the voltage values, the discharge balancing device of the present invention utilizes the gas gauge circuit for measuring the capacities of the electric energy storage units, and drains the bypass current according to the capacities of the electric energy storage units, thus avoiding the ill electric energy storage unit depleting faster problem. Therefore, the discharge balancing device of the present invention lengthens the life of the battery pack.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A discharge balancing device, for balancing a plurality of electric energy storage units connected in series in a discharge stage, comprising:
   a plurality of bypass units, respectively connected to the plurality of electric energy storage units in parallel, configured to drain bypass currents from the plurality of electric energy storage units according to control signals;
   an energy condition measurement circuit, coupled to the plurality of the electric energy storage units, configured to measure capacities of the plurality of electric energy storage units; and
   a balancing control unit, coupled to the energy condition measurement circuit and the plurality of bypass units, configured to generate each of the control signals according to the measured capacities by the energy condition measurement circuit, so as to control each of the plurality of bypass units whether to drain a bypass current from a corresponding electric energy storage unit;
   wherein when a capacity difference between a largest capacity and a lowest capacity of the plurality of electric energy storage units is greater than a predefined value, the bypass unit corresponding to the electric energy storage unit with the largest capacity is controlled to drain a bypass current from the corresponding electric energy storage unit.

2. The discharge balancing device of claim 1, wherein each of the plurality of bypass units comprises:
   a switch unit, configured to conduct the bypass current according to a control signal generated by the balancing control unit; and
   an impedance unit, configured to determine a magnitude of the bypass current, wherein the impedance unit comprises a plurality of resistors configured to adjust an impedance value in response to the control signal;
   wherein the switch unit and the impedance unit are connected in series.

3. The discharge balancing device of claim 2, wherein the switch unit is a transistor.

4. The discharge balancing device of claim 2, wherein each of the plurality of resistors in the impedance unit is a variable resistor or a voltage controlled resistor.

5. The discharge balancing device of claim 2, wherein the magnitude of the bypass current relates to a discharging rate of the corresponding electric energy storage unit.

6. The discharge balancing device of claim 1, wherein the energy condition measurement circuit comprises at least a gas gauge circuit, for measuring a capacity of each of the plurality of electric energy storage units.

7. The discharge balancing device of claim 2, wherein each of the plurality of resistors in the impedance unit is a fixed resistor.

8. A discharge balancing method, for balancing a plurality of electric energy storage units connected in series in a discharge stage, the discharge balancing method comprising:
   measuring capacities of the plurality of electric energy storage units;
   controlling each of the plurality of bypass units whether to drain a bypass current from a corresponding electric energy storage unit according to the measured capacities, wherein each bypass unit comprises a plurality of resistors configured to adjust an impedance value in response to a control signal; and
   controlling, when a capacity difference between a largest capacity and a lowest capacity of the plurality of electric energy storage units is greater than a predefined value, the bypass unit corresponding to the electric energy storage unit with the largest capacity to drain a bypass current from the corresponding electric energy storage unit.

9. The discharge balancing method of claim 8, wherein a magnitude of the bypass current relates to a discharging slope of the corresponding electric energy storage unit.

10. The discharge balancing method of claim 8, wherein each of the plurality of resistors comprises a voltage controlled resistor.

11. The discharge balancing method of claim 8, wherein each of the plurality of resistors comprises a fixed resistor.

12. A power supply system, comprising:
    a plurality of electric energy storage units, connected in series; and
    a discharge balancing device, coupled to the plurality of electric energy storage units, for balancing the plurality of electric energy storage units in a discharge stage, the discharge balancing device comprising:
       a plurality of bypass units, respectively connected to the plurality of electric energy storage units in parallel, configured to drain bypass currents from the plurality of electric energy storage units according to control signals;
       an energy condition measurement circuit, coupled to the plurality of the electric energy storage units, configured to measure capacities of the plurality of electric energy storage units; and
       a balancing control unit, coupled to the energy condition measurement circuit and the plurality of bypass units, configured to generate each of the control signals according to the measured capacities by the energy condition measurement circuit, so as to control each of the plurality of bypass units whether to drain a bypass current from a corresponding electric energy storage unit;
       wherein when a capacity difference between a largest capacity and a lowest capacity of the plurality of electric energy storage units is greater than a predefined value, the bypass unit corresponding to the electric energy storage unit with the largest capacity is controlled to drain a bypass current from the corresponding electric energy storage unit.

13. The power supply system of claim 12, wherein each of the plurality of electric energy storage units comprises at least a battery cell, and the at least a battery cell are connected either in series or in parallel.

14. The power supply system of claim 12, wherein each of the plurality of bypass units comprises:
- a switch unit, configured to conduct the bypass current according to a control signal generated by the balancing control unit; and
- an impedance unit, configured to determine a magnitude of the bypass current, wherein the impedance unit comprises a plurality of resistors configured to adjust an impedance value in response to the control signal; wherein the switch unit and the impedance unit are connected in series.

15. The power supply system of claim 14, wherein the switch unit is a transistor.

16. The power supply system of claim 14, wherein each of the plurality of resistors in the impedance unit is a variable resistor or a voltage controlled resistor.

17. The power supply system of claim 14, wherein the magnitude of the bypass current relates to a discharging rate of the corresponding electric energy storage unit.

18. The power supply system of claim 12, wherein the energy condition measurement circuit comprises at least a gas gauge circuit, for measuring a capacity of each of the plurality of electric energy storage units.

19. The power supply system of claim 14, wherein each of the plurality of resistors in the impedance unit is a fixed resistor.

20. A discharge balancing device, for balancing a plurality of electric energy storage units connected in series in a discharge stage, comprising:
- a plurality of switch units, connected in series and parallel to the plurality of electric energy storage units, each configured to be conducted according to control signals;
- a plurality of impedance units, each having one terminal electrically connected to adjacent electric energy storage units of plurality of electric energy storage units and another terminal electrically connected to adjacent switch units of the plurality of switch units, wherein each impedance unit comprises a plurality of resistors configured to adjust an impedance value in response to the control signal;
- an energy condition measurement circuit, coupled to the plurality of the electric energy storage units, configured to measure capacities of the plurality of electric energy storage units; and
- a balancing control unit, coupled to the energy condition measurement circuit and the plurality of switch units, configured to generate each of the control signals according to the measured capacities by the energy condition measurement circuit, so as to control each of the plurality of switch units whether to drain a bypass current from a corresponding electric energy storage unit;
- wherein when a capacity difference between a largest capacity and a lowest capacity of the plurality of electric energy storage units is greater than a predefined value, the bypass unit corresponding to the electric energy storage unit with the largest capacity is controlled to drain a bypass current from the corresponding electric energy storage unit.

21. The discharge balancing device of claim 20, wherein the switch unit is a transistor.

22. The discharge balancing device of claim 20, wherein each of the plurality of resistors in the impedance unit is a variable resistor or a voltage controlled resistor.

23. The discharge balancing device of claim 20, wherein a magnitude of the bypass current relates to a discharging rate of the corresponding electric energy storage unit.

24. The discharge balancing device of claim 20, wherein the energy condition measurement circuit comprises at least a gas gauge circuit, for measuring a capacity of each of the plurality of electric energy storage units.

25. The discharge balancing device of claim 20, wherein each of the plurality of resistors in the impedance unit is a fixed resistor.

26. A power supply system, comprising:
- a plurality of electric energy storage units, connected in series; and
- a discharge balancing device, coupled to the plurality of electric energy storage units, for balancing the plurality of electric energy storage units in a discharge stage, the discharge balancing device comprising:
  - a plurality of switch units, connected in series and parallel to the plurality of electric energy storage units, each configured to be conducted according to control signals;
  - a plurality of impedance units, each having one terminal electrically connected to adjacent electric energy storage units of plurality of electric energy storage units and another terminal electrically connected to adjacent switch units of the plurality of switch units, wherein each impedance unit comprises a plurality of resistors configured to adjust an impedance value in response to the control signal;
  - an energy condition measurement circuit, coupled to the plurality of the electric energy storage units, configured to measure capacities of the plurality of electric energy storage units; and
  - a balancing control unit, coupled to the energy condition measurement circuit and the plurality of switch units, configured to generate each of the control signals according to the measured capacities by the energy condition measurement circuit, so as to control each of the plurality of switch units whether to drain a bypass current from a corresponding electric energy storage unit;
  - wherein when a capacity difference between a largest capacity and a lowest capacity of the plurality of electric energy storage units is greater than a predefined value, the bypass unit corresponding to the electric energy storage unit with the largest capacity is controlled to drain a bypass current from the corresponding electric energy storage unit.

27. The power supply system of claim 26, wherein each of the plurality of electric energy storage units comprises at least a battery cell, and the at least a battery cell are connected either in series or in parallel.

28. The power supply system of claim 26, wherein the switch unit is a transistor.

29. The power supply system of claim 26, wherein each of the plurality of resistors in the impedance unit is a variable resistor or a voltage controlled resistor.

30. The power supply system of claim 26, wherein the magnitude of the bypass current relates to a discharging rate of the corresponding electric energy storage unit.

31. The power supply system of claim 26, wherein the energy condition measurement circuit comprises at least a gas gauge circuit, for measuring a capacity of each of the plurality of electric energy storage units.

32. The power supply system of claim 31, wherein each of the plurality of resistors in the impedance unit is a fixed resistor.

* * * * *